(12) United States Patent
Lynn et al.

(10) Patent No.: US 11,444,941 B2
(45) Date of Patent: Sep. 13, 2022

(54) MULTIFACTOR DERIVED IDENTIFICATION

(71) Applicant: Cisco Technology, Inc., San Jose, CA (US)

(72) Inventors: Alan Robert Lynn, Burke, VA (US); Frank Michaud, Pully (CH); Carlos M. Pignataro, Cary, NC (US); Rajiv Asati, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 325 days.

(21) Appl. No.: 16/748,965

(22) Filed: Jan. 22, 2020

(65) Prior Publication Data

US 2020/0322329 A1 Oct. 8, 2020

Related U.S. Application Data

(60) Provisional application No. 62/830,629, filed on Apr. 8, 2019.

(51) Int. Cl.
| | |
|---|---|
| *H04L 29/06* | (2006.01) |
| *H04L 9/40* | (2022.01) |
| *G06F 7/58* | (2006.01) |

(52) U.S. Cl.
CPC .......... *H04L 63/0861* (2013.01); *G06F 7/588* (2013.01)

(58) Field of Classification Search
None
See application file for complete search history.

(56) References Cited

U.S. PATENT DOCUMENTS

| | | | |
|---|---|---|---|
| 6,401,206 B1 | 6/2002 | Khan et al. | |
| 6,735,695 B1 * | 5/2004 | Gopalakrishnan | ...... G06F 21/32 726/19 |
| 6,845,453 B2 | 1/2005 | Scheidt et al. | |
| 9,160,730 B2 | 10/2015 | Sheller et al. | |
| 9,614,843 B2 | 4/2017 | Jia et al. | |
| 10,019,561 B1 | 7/2018 | Shelton et al. | |
| 10,122,710 B2 | 11/2018 | Tomlinson et al. | |
| 10,289,819 B2 | 5/2019 | Stavrou et al. | |

(Continued)

OTHER PUBLICATIONS

"IEEE Standard for Biometric Open Protocol," in IEEE Std 2410-2017 (Revision of IEEE 2410-2015), vol., No., pp. 1-88, Oct. 20, 2017, doi: 10.1109/IEEESTD.2017.8089818, author unknown, (Year: 2017).*

(Continued)

*Primary Examiner* — Piotr Poltorak
(74) *Attorney, Agent, or Firm* — Polsinelli

(57) ABSTRACT

The present technology pertains to a system that authenticates the identity of a user trying to access a service. The system comprises an authentication provider configured to communicate authentication requirements to a continuous multifactor authentication device and the continuous multifactor authentication device configured to receive authentication requirements, to fuse multiple identification factors into an identification credential for a user according to the authentication requirements, and to send the authentication credential to the authentication provider. After receiving the identification credential meeting the authentication requirements, the authentication provider is configured to instruct a service provider to initiate a session.

14 Claims, 17 Drawing Sheets

(56) References Cited

U.S. PATENT DOCUMENTS

| | | | |
|---|---|---|---|
| 10,303,869 B1 | 5/2019 | Duke et al. | |
| 2002/0091937 A1* | 7/2002 | Ortiz | H04W 12/06 |
| | | | 726/5 |
| 2008/0008173 A1 | 1/2008 | Kanevsky et al. | |
| 2008/0289020 A1 | 11/2008 | Cameron et al. | |
| 2009/0320108 A1* | 12/2009 | Livingston | G06F 21/31 |
| | | | 726/6 |
| 2017/0346837 A1 | 11/2017 | Vaswani et al. | |
| 2018/0131686 A1 | 5/2018 | Brannon | |
| 2018/0285600 A1* | 10/2018 | Hunt | H04L 9/3234 |

OTHER PUBLICATIONS https://youtu.be/AtQrG9gMbVQ, Nov. 16, 2017.

\* cited by examiner

Figure 10

Service Provider Interface 1000

Corporate Network 940

Identity Requirements 1030

| | |
|---|---|
| Minimum Trust Score | 80 |

| | | |
|---|---|---|
| Face | Required | |
| Valid For | 1 hour | |

| | | |
|---|---|---|
| Voice | Required | |
| Valid For | 1 hour | |

| | | |
|---|---|---|
| Gait | Required | |
| Valid For | 1 hour | |

| | | |
|---|---|---|
| Fingerprint | Required | |
| Valid For | 1 hour | |

Context Requirements 1040

| | | |
|---|---|---|
| Location | Required | |
| Valid For | 1 minute | |
| Requirement | On campus | |

| | | |
|---|---|---|
| P.o.L. | Required | |
| Valid For | 1 week | |
| Requirement | 70% match | |

| | | |
|---|---|---|
| Device | Required | |
| Valid For | 1 hour | |
| Requirement | Face up | |

| | | |
|---|---|---|
| Network | Required | |
| Valid For | 1 minute | |
| Requirement | Secured | |

Current User Status 910

Current Trust Score: 82

Identity

Context — Shared

Dynamic Monitoring — Current

MULTIFACTOR DERIVED IDENTIFICATION

CROSS-REFERENCE TO RELATED APPLICATIONS

This application claims priority to U.S. Provisional Patent Application No. 62/830,629, filed on Apr. 8, 2019, the content of which is incorporated herein by reference in its entirety.

TECHNICAL FIELD

The present technology pertains to a system that continuously authenticates a user, and more specifically, the present technology pertains to a system that continuously authenticates a user according to application or service provider access policies while maintaining user identifying data under the control of a user device.

BACKGROUND

Users and devices are now commonly authenticated with user names and passwords, pin codes, two factor authentication, or cryptographic keys. However, all of these authentication methods are vulnerable at some level and each comes with various drawbacks. One is that it is hard to authenticate entities with high certainty—all of the most common authentication mechanisms are relatively vulnerable. A second problem is that trusted devices can become compromised or stolen. A third problem is that login application or service providers learn and collect peoples' personal information and personal identifying information, and this is not desirable. A fourth problem is that current authentication mechanisms are only focused on initiating a session and are therefore vulnerable to devices that have an authenticated session being stolen (when the user walks away from a desk, for example).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 10 illustrates an example configuration of devices and a network in accordance with some aspects of the present technology;

DESCRIPTION OF EXAMPLE EMBODIMENTS

Figure 1:
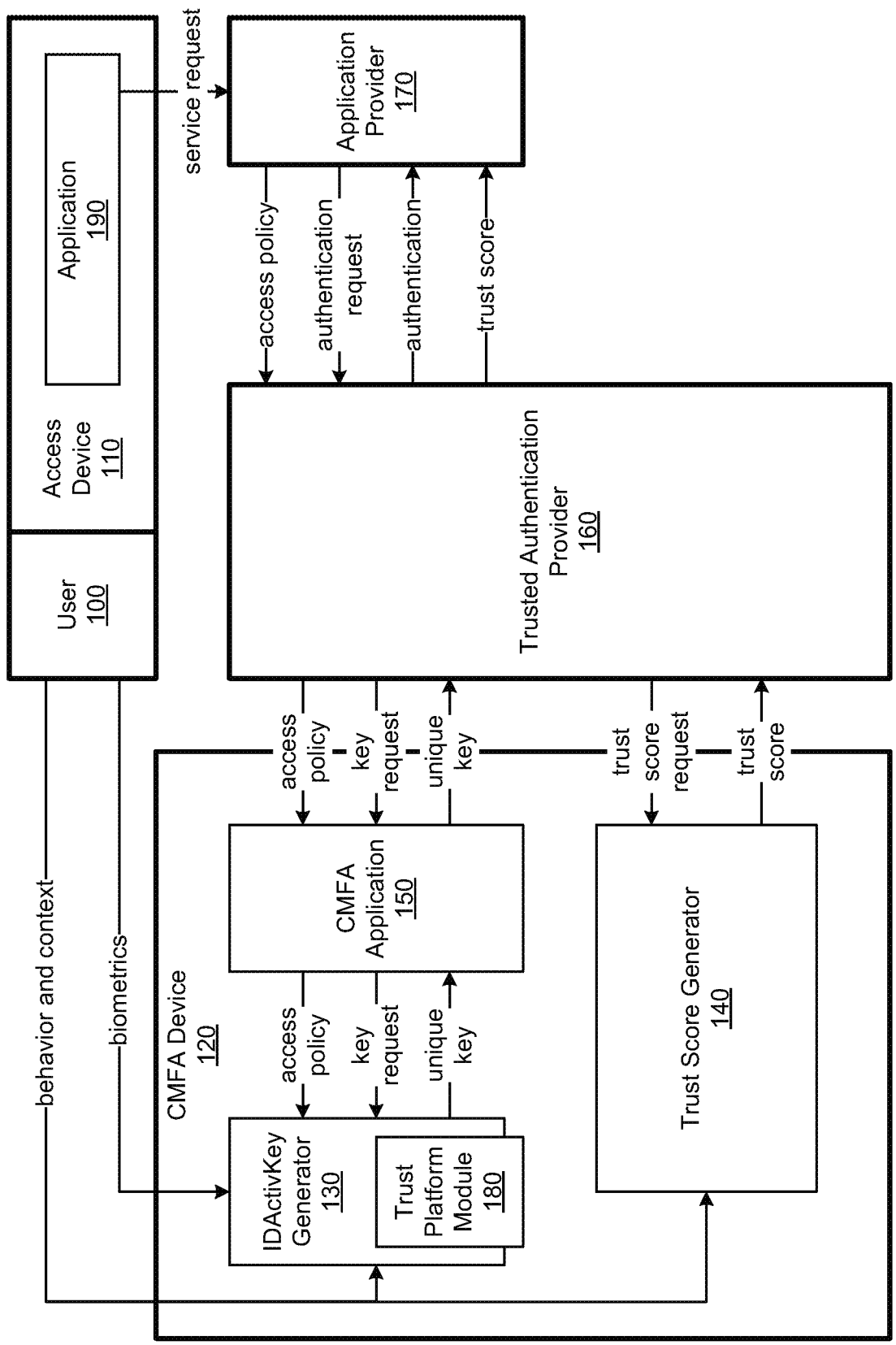
FIG. 1 illustrates an example configuration of devices and a network in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology pertains to a continuous identity and authentication platform. An authentication provider is configured to communicate authentication requirements to a continuous multifactor authentication device, while the continuous multifactor authentication device is configured to receive authentication requirements, to fuse multiple identification factors into an identification authentication and trust credential for a user according to the authentication requirements, and to send the identification authentication and trust credential to the authentication provider, which can comprise one or multiple entities. After receiving the identification authentication and trust credential meeting the authentication requirements, the authentication provider is configured to instruct a application or service provider to initiate and maintain a session or access specific resources.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It is hard to overstate the importance of proper continuous identification authentication in networking contexts. As networking devices have become ubiquitous in business, government, and private life, ensuring that network users "are who they say they are" is a fundamental challenge in modern security. In recent years, a proliferation of strategies, including two-factor authentication and biometric authentication, among others, have attempted to address this problem. However, these solutions and others fall short of obtaining their true objective: to ensure with high certainty who is using a device or service at any given moment.

Broadly speaking, there are four primary challenges facing any authentication technology: 1) authenticating a specific device, 2) authenticating a user on that device, 3) protecting users and devices from collection of sensitive information, and 4) maintaining device and user authentication over the course of a session while preserving their privacy. The present technology aims to address all four of these problems with a continuous multi-factor authentication scheme.

The present technology can continuously utilize multi-factor authentication techniques to verify the identity of a user and authenticate access devices to ensure device and networking security, and it does so in such a way that sensitive information is shielded from data collection practices.

The present technology is a system that can utilize a trusted personal computing device (hereafter referred to as a continuous multi-factor authentication device or CMFA device) to continuously authenticate a user. The CMFA device is the only device in the continuous multi-factor authentication system to learn a user's personal identifying information.

As explained in further detail herein, the CMFA device can derive an identification credential (an IDActivKey) that is unique to every service or resource which requires authentication of a user. The identification credential is derived by combining a user's biometric information and hardware cryptographic information given the appropriate "context" of the user (such as location, proximity to another device, or other contextual information). The CMFA device can repeatedly calculate a trust score indicating the CMFA device's confidence in its user authentication, the user's presence, or the user's compliance with access policies defined by the service or resource.

The present technology is useful to authenticate a user or device to a service or resource prior to authorizing access to the service or resource, and to calculate a trust score that can be used to determine whether the authenticated user's session should remain in place. The service or resource can interact with an authentication provider in order to provide a policy that specifies conditions upon which a user should be authenticated and conditions upon which an authenticated user can remain in an established session. The authentication provider can interface with the user's CMFA device to inform the user of policy requirements.

While the present technology is called a continuous multi-factor authentication system, and some aspects of the present technology call for continuous authentication or continuous calculation of trust scores or other continuous activities, it will be appreciated by those of ordinary skill in the art that continuous can refer to repeated or periodic actions that confirm authentication or trust in authentication. The term continuous also does not refer to an infinite duration, and rather can be limited to the length of a session with an access device or application or service provider.

FIG. 1 illustrates an example continuous multi-factor authentication system in accordance with some aspects of the present technology.

As illustrated in FIG. 1, User 100 can send a service request via Access Device 110 to Application Provider 170. Application Provider 170 can be any service, resource, device or entity to which Access Device 100 can connect. For example Application Provider 170 can be a social media service, bank, hospital, motor vehicle department, bar, voting system, IOT device, or access device.

Application Provider 170 can authenticate the identity of User 100 through Trusted Authentication Provider 160, which is in communication with CMFA Device 120 to authenticate the identity of User 100. "CMFA" stands for "continuous multi-factor authentication."

User 100 can be any user including an employee, contractor, client, member of an organization, or private individual, etc. attempting to access a service. Access Device 110 can be a mobile device or personal computer; it may or may not be the same device as CMFA Device 120. In some embodiments, CMFA Device 120 can be used to log in to Access Device 110.

CMFA Device 120 can gather data ultimately used to authenticate User 100 to Application Provider 170 when a request is sent by Application Provider 170 to Trusted Authentication Provider 160 to authenticate the user, and then Trusted Authentication Provider 160 requests CMFA Device 160 to provide the identification credential (an IDActivKey) that is unique to Application Provider 170. CMFA Device 120 can be associated with User 100, and gather biometric, behavioral, and contextual data. The biometric, behavioral, and/or contextual data is used by IDActivKey Generator 130, to generate a unique IDActivKey corresponding to Application Provider 170. In some embodiments behavioral and contextual data can be utilized in the creation of the IDActivKey, or at a minimum, can be used as thresholds to ensure that the context of Access Device 110 and User 100 are acceptable as specified by a policy of Application Provider 170.

Behavioral and contextual data can also be used by Trust Score Generator 140, which can generate a trust score as a measure of confidence in the authentication of User 100 and that the authenticated User 100 is still present and operating Access Device 110 in an acceptable manner as specified by a policy of Application Provider 170.

CMFA Device 120 can be hardware, software-only, or combinations thereof. CMFA Device 120 can be a mobile device or a personal computer; it may or may not be the same device as Access Device 110. In some embodiments, CMFA Device 120 includes secure hardware such as Trust Platform Module 180 in combination with CMFA Application 150 and IDActivKey Generator 130 that can work together to generate IDActivKeys and ensure compliance with application or service provider policies. In some embodiments Application Provider 170 can be accessed through Application 190 on Access Device 110. In some instances Application 190 can be an application that is specifically for accessing Application Provider 170 or can be a more general application, which can access multiple services, such as a web browser, or portions of an operating system.

IDActivKey Generator 130 can collect biometrics from User 100. These biometrics can include, for example, fingerprints, facial detection, retinal scans, voice identification, or gait data, among other biometrics. For each Application Provider 170, a cryptographic seed from a pseudo-arbitrary number generator in Trust Platform Module 180 can be used to select a sampling of the biometric data to be used as an IDActivKey for the application in question. In some embodiments, the IDActivKey may only be derived when CMFA Device 120 determines that certain behavioral and contextual requirements indicate compliance with a policy. In some embodiments, there might be a "master" IDActivKey that is used to gain access to Trusted Authentication Provider 160.

In some cases, trusted computing implementations, such as Trusted Platform Module 180, can rely on roots of trust. Roots of trust can provide assurances that the root has been implemented in a way that renders it trustworthy.

A certificate may identify the manufacturer and evaluated assurance level (EAL) of Trusted Platform Module 180. Such certification can provide a level of confidence in the roots of trust used in Trusted Platform Module 180. Moreover, a certificate from a platform manufacturer may provide assurance that Trusted Platform Module 180 was properly installed on a system that is compliant with specific requirements so the root of trust provided by the platform may be trusted. Some implementations can rely on three roots of trust in a trusted platform, including roots of trust for measurement (RTM), storage (RTS), and reporting (RTR).

Trust Score Generator 140 can detect behavioral and contextual data from User 100, the surrounding environment, or other sources. For example, location information could be derived from the network that Access Device 110 is connected to. These data can include information about location, movement, or device behavior. From this information, Trust Score Generator 140 can generate a trust score which reflects a confidence level that User 100 is in compliance with a policy specified by Application Provider 170. This includes the confidence that User 100 is the person operating the current session.

In some embodiments, one or more of IDActivKey Generation 130, Trust Platform Module 180, and Trust Score Generator 140 can be located in a physically separate and secure portion of CMFA Device 120.

In response to a service request from Application 190 on Access Device 110, Application Provider 170 can request authentication of User 100's identity through Trusted Authentication Provider 160. Trusted Authentication Provider 160 can store information about the access requirements for Application Provider 170 and request an IDActivKey and trust score from CMFA Device 120 in response to an authentication request. Upon receiving an IDActivKey and a trust score, Trusted Authentication Provider 160 can use this information in tandem with the access requirements received from Application Provider 170 to authenticate a session with Application Provider 170 on behalf of Application Provider 170.

Trusted Authentication Provider 160 can request updated IDActivKeys and trust scores at different intervals depending on the requirements specified by the access policies defined by Application Provider 170 and can send new access policies in response to new information during a session. Trusted Authentication Provider 160 can also shield private information from Application Provider 170, providing authentication without revealing information such as birth dates, social security numbers, or marital status, etc. In some embodiments, Trusted Authentication Provider 160 need only inform a Application Provider 170 that access should be granted, while in some embodiments Trusted Authentication Provider 160 can also send the IDActivKey for the service to the Application Provider 170.

While FIG. 1 only illustrates one Application 190, and one Application Provider 170, it should be appreciated that there can be any number of Applications 190 or Application Providers 170. Each Application Provider 170 can have its own access policy, and any IDActivKey will be unique to each respective Application Provider 170.

Figure 2:
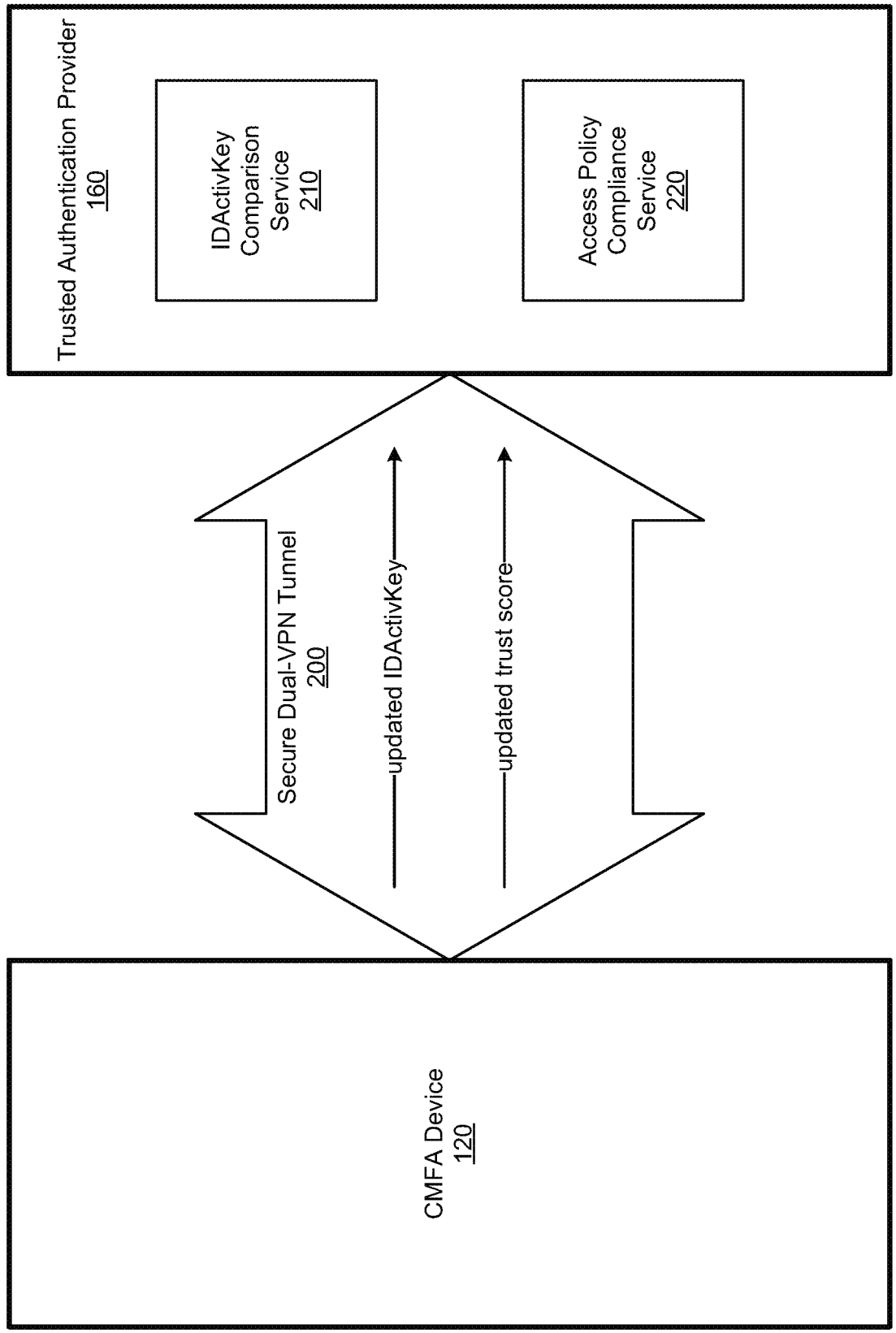
FIG. 2 illustrates an example configuration of devices and a network in detail in accordance with some aspects of the present technology.

FIG. 2 illustrates an example system for communication between CMFA Device 120 and Trusted Authentication Provider 160 in accordance with the present technology. CMFA Device 120 and Trusted Authentication Provider 160 can exchange information such as IDActivKeys, trust scores, or application or service provider policies over a Secure Dual-VPN Tunnel 200.

Secure Dual-VPN Tunnel 200 can be set up when Trusted Authentication Provider 160 requests an updated IDActivKey or trust score from CMFA Device 120. The tunnel includes a VPN within a VPN, which adds an extra layer of security for the transmitted information.

IDActivKey Comparison Service 210 can compare an IDActivKey stored on Trusted Authentication Provider 160 with the updated IDActivKey sent across Secure Dual-VPN Tunnel 200. Some variation between the received IDActivKey and the stored IDActivKey is expected due to the nature of biometrics that comprise the IDActivKey, as well as due to the types of biometrics available in a given moment. However, if the variation too large, then Trusted Authentication Provider 160 can fail to authenticate a session or terminate the current session through Access Policy Compliance Service 220, or change the access level of User 100. For instance, having great certainty in the identity and compliance of User 100 can result in full access to an Application Provider 170, but lesser certainty can result in restricted access, while low certainty can result in authentication failure or session termination.

Access Policy Compliance Service 220 takes information from IDActivKey Comparison Service 210 and the updated trust score to make any needed changes to the existing access policy—such as to terminate or suspend an active session, or alter access levels.

Figure 3A:
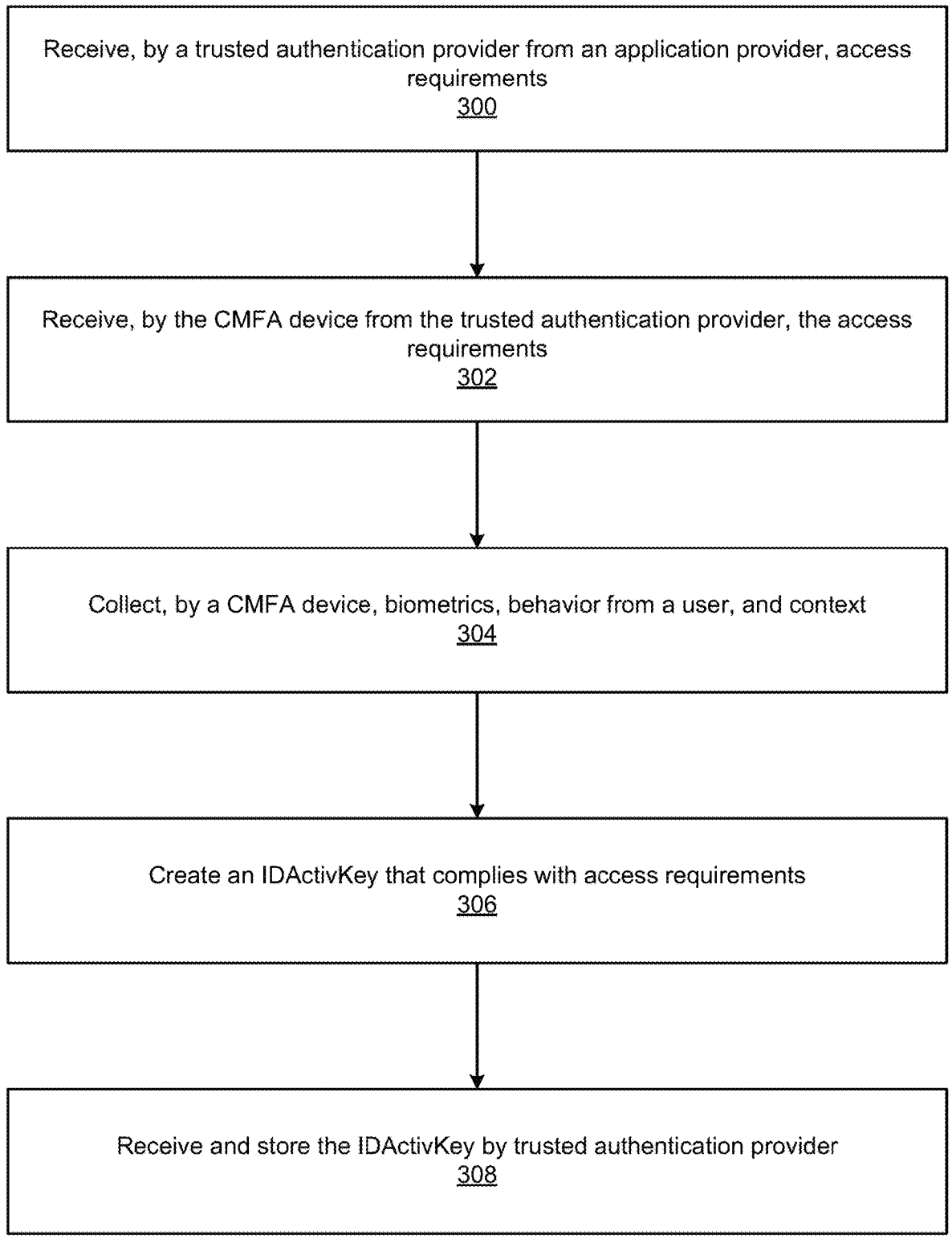
FIG. 3A and FIG. 3B illustrate example method embodiments in accordance with some aspects of the present technology.
Figure 3B:
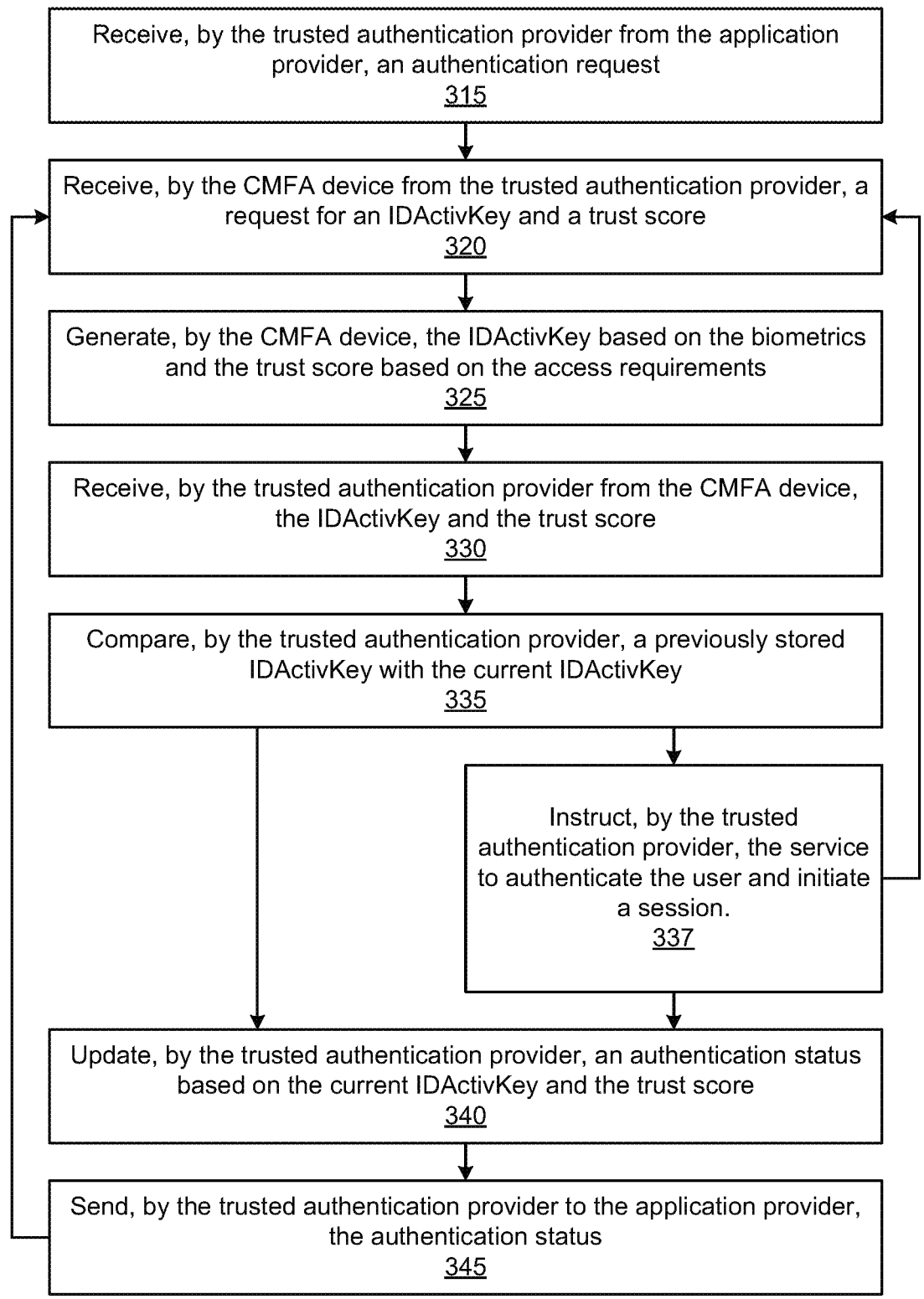

FIG. 3A and FIG. 3B illustrate an example method in accordance with the present technology. This method can be carried out by the system illustrated in FIG. 1. However, nothing in FIG. 3A or FIG. 3B should be considered limiting of the system illustrated in FIG. 1, and likewise, the system illustrated in FIG. 1 should not be interpreted to limit the method of FIG. 3A or FIG. 3B. Any limitation of the depicted system or method will be recited in the appended claims.

FIG. 3A illustrates a method for establishing an IDActivKey for a Application Provider 170 in compliance with access requirements provided by Application Provider 170. Trusted Authentication Provider 160 can receive (300) access requirements from Application Provider 170. These access requirements can include necessary biometrics, behavior, or context from CMFA Device 120, as well as a trust score threshold. Different application or service providers can have different access requirements. For instance, a social networking service may only require the IDActivKey to access the service, while a home security service may have a location requirement that demands User 100 be within a certain radius of the home itself.

Trusted Authentication Provider 160 can send and CMFA Device 120 can receive (302) the access requirements for Application Provider 170. In response CMFA Device 120 can then collect (304) biometric and behavior information from the user and any contextual information, and can create (306) an IDActivKey that complies with the access requirements for Application Provider 170 and other principles in accordance with the present technology (for example as addressed in FIG. 6). CMFA device can send the generated IDActivKey to Trusted Authenticated Provider 160, which is stored (308) by Trusted Authenticated Provider 160 to compare with later received versions of the IDActivKey as described in FIG. 3B.

FIG. 3B illustrates an example method for handling an authentication request. Trusted Authentication Provider 160 can receive (315) an authentication request from Application or service provider 170. Trusted Authentication Provider 160 can then send a similar request to CMFA Device 120.

CMFA Device 120 can receive (320) the request from Trusted Authentication Provider 160 for an IDActivKey corresponding to Application Provider 170. The IDActivKey and trust score are generated (325) by IDActivKey Generator 130 and Trust Score Generator 140, respectively. The IDActivKey is generated from the biometrics in accordance with the access requirements for Application Provider 170. More secure services can require IDActivKeys to be made of multiple biometrics, such as fingerprints, retinal scans, and facial recognition, while others can require only a fingerprint. The trust score uses behavioral and contextual information to reflect the confidence level that User 100 is in compliance with a policy specified by Application Provider 170.

Trusted Authentication Provider 160 receives (330) from CMFA Device 120 the IDActivKey and the trust score. Trusted Authentication Provider 160 compares (335) the received IDActivKey with a previously stored IDActivKey. A sufficient difference between the received and stored IDActivKey will lower the confidence Trusted Authentication Provider 160 has that User 100 is the user operating Access Device 110 and/or CMFA Device 120. Assuming the IDActivKey sufficiently matches the version of the IDActivKey stored by Trusted Authentication Provider 160, Trusted Authentication Provider 160 can instruct (337) the service to authenticate the User and initiate a session.

After the session has been established, and based on the access requirements for Application Provider 170, Trusted Authentication Provider 160 may continuously or periodically maintain trust that User 100 is still operating Access Device 110 and therefore the session can be maintained. Accordingly, the method can return to step 320 to repeatedly generate the IDActivKey or to collect context or behavior information in accordance with the access policy.

This variation, in combination with the received trust score, allows Trusted Authentication Provider 160 to update (340) an authentication status for the service request sent by Access Device 110. This status will be based on the requirements previously received from Application Provider 170, and that status (with accompanying access rights) can be dynamically changed with updates to the IDActivKey or trust store.

The authentication status is sent (345) to Application Provider 170 from Trusted Authentication Provider 160. With this information, Application Provider 170 can maintain or terminate the session. The method can return to step 320 to repeatedly generate the IDActivKey or to collect context or behavior information in accordance with the access policy.

IDActiveKey Generation

The identification credential (sometimes referred to herein as an IDActivKey) used to authenticate User 100 on Access Device 110 is made of a pseudo-arbitrary sampling of biometric data (such as fingerprint data, retinal scan data, or facial recognition, for example) collected by CMFA Device 120. The identification credential is unique not only to the user, but is unique to each Application Provider 170 that the user attempts to access. Confidential biometric data is obtained, and the IDActivKey is created, in a trusted execution environment, whereas user context data is collected in a general-purpose rich execution environment.

Figure 4:
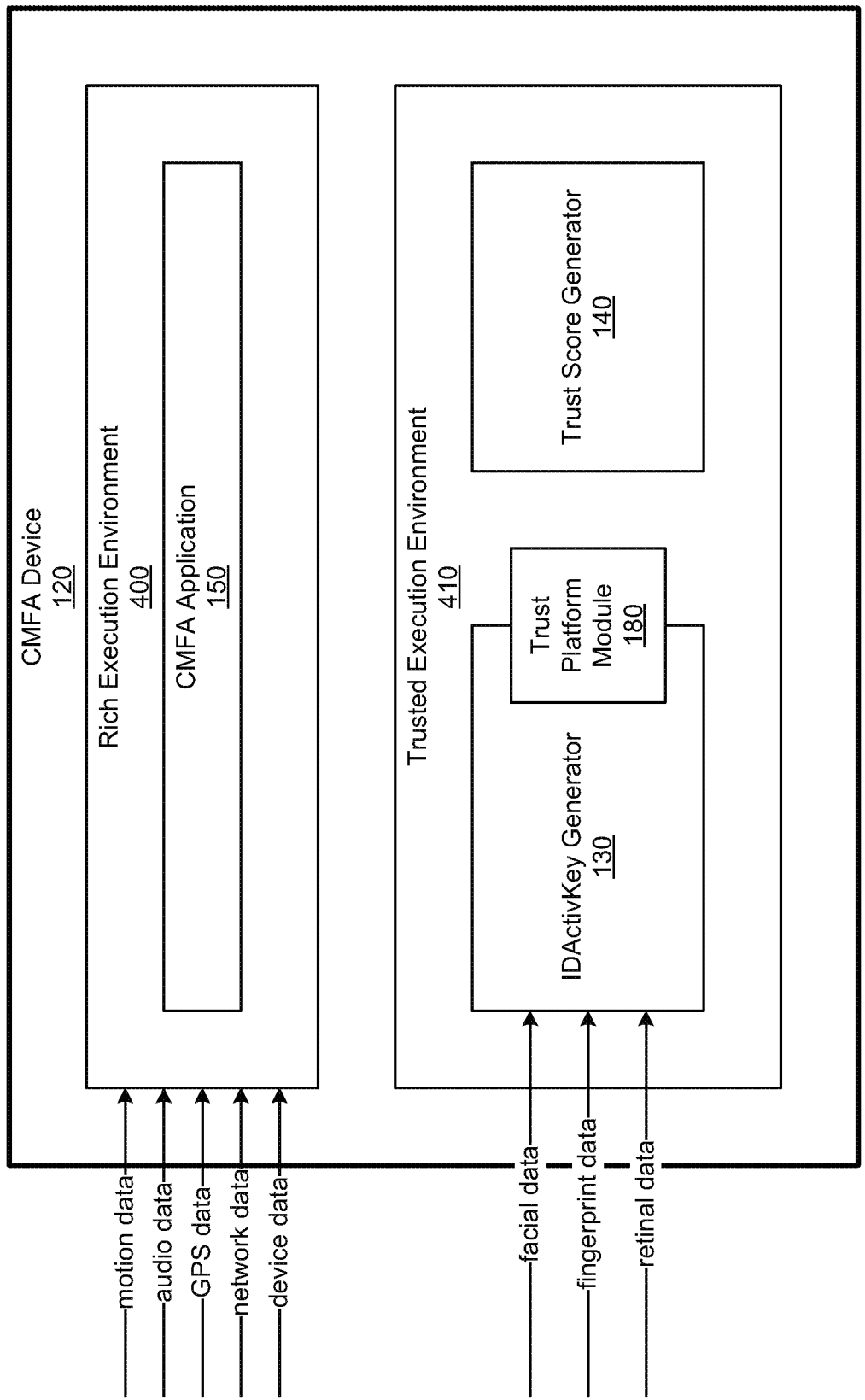
FIG. 4 illustrates an example configuration of devices and a network in accordance with some aspects of the present technology.

FIG. 4 illustrates an example system in accordance with the present technology. A device can have two separate environments—the Rich Execution Environment 400, which generally receives non-identifying data, for example, location and network, and the Trusted Execution Environment 410, which generally receives identifying data such as biometrics from the user and can receive other data from Rich Execution Environment 400. Rich Execution Environment 400 can execute applications and other services on the device. Trusted Execution Environment 410 can be a physically secure or at least segregated, trusted environment that can generate identification credentials and trust scores for use by the applications and services in Rich Execution Environment 400.

Rich Execution Environment 400 is the environment in which CMFA Application 150 executes. It leverages information collected from services and applications operating in Rich Execution Environment 400, such as information about what other devices are connected with CMFA Device 120, such as smart watches or Bluetooth headphones. It further collects hardware sensor data including location coordinates, accelerometer data, and gyroscope data. In some embodiments, some of the data collected or derived by applications in Rich Execution Environment 400 can be personal identifiable information or biometric information. In such embodiments, any such data should be collected, derived, stored, and accessed according to an industry acceptable privacy policy.

Trusted Execution Environment 410 is configured to store and collect biometric information or other user identifiable information. In general, any special purpose hardware or software that is configured to collect biometric information should reside under the control of Trusted Execution Environment 410. Trusted Execution Environment 410 can also perform continuous multifactor authentication and includes a system for generating cryptographic seeds in Trust Platform Module 180 used by IDActivKey Generator 130. The continuous multifactor authentication includes both a creation of an IDActivKey by IDActivKey Generator 130 and continuously provides a calculation of a trust score by Trust Score Generator 140. The biometric information can be stored in the Trusted Execution Environment 410 hardware on CMFA Device 120. Trusted Execution Environment 410 can be secure hardware, a special purpose chip, that functions as a combined secure area for receiving and storing biometric information combined with Trusted Platform Module 180 or other cryptographic chip to generate cryptographic seeds.

Figure 5:
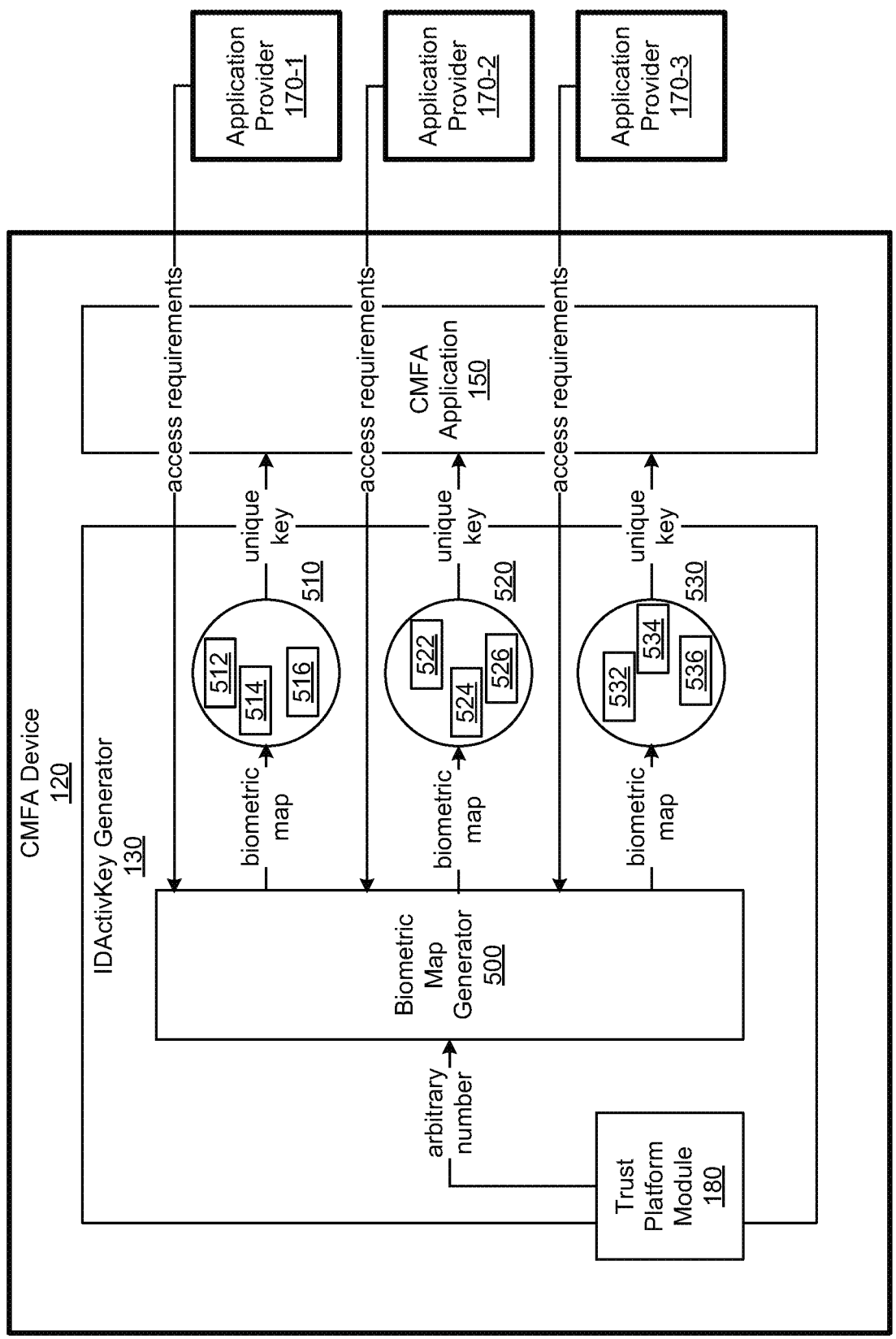
FIG. 5 illustrates an example configuration of devices and a network in detail in accordance with some aspects of the present technology.

FIG. 5 illustrates an example configuration of devices and a network in accordance with some aspects of the present technology. As illustrated in FIG. 5, an identification credential is generated from the combination of a random number with biometrics in line with requirements stipulated by a application or service provider policy. The random number dictates the sampling of the biometrics that will result in the identification credential. This credential is passed on to the requesting application.

Within CMFA Device 120, IDActivKey Generator 130 can receive an arbitrary number from Trust Platform Module 180 and Biometric Map Generator 500 can use the arbitrary number, in tandem with access requirements specified by a policy from one of Application Providers 170, to generate a biometric map, which dictates the sampling of biometric data that will form the IDActivKey for a specific Application Provider 170.

Biometrics 510 comprise the set of biometrics available for User 100 on CMFA Device 120 that are required by Application Provider 170-1's policy, and from which an IDActivKey for that application or service provider can be generated. The biometric map generated from Biometric Map Generator 500 consists of Samples 512, 514, and 516. These samples dictate what region of data will be sampled. For instance, Sample 512 may be a portion of a fingerprint, Sample 514 may be a portion of a retina scan, and Sample 516 may be a portion of a facial scan.

Samples 512, 514, and 516 are portions of the biometric data. These portions remain static and unique for each IDActivKey, but the biometric data itself may vary as it is updated from User 100. For instance, if Sample 512 is the top half of a fingerprint, the biometric data corresponding to the top half of the fingerprint will vary slightly as the fingerprint is remeasured and updated. Another source of variation lies in what biometrics are available at a given moment.

The same process applies for Application Providers 170-2 and 170-3, where Biometrics 520 are 530 are sampled using Samples 522, 524, and 526 for Application Provider 170-2 and Biometrics 530 are samples using Samples 532, 534, and 536 for Application Provider 170-3.

IDActivKey 130 can send the generated IDActivKey to CMFA Application 150 for use in authentication protocols described in detail elsewhere in this document.

Figure 6:
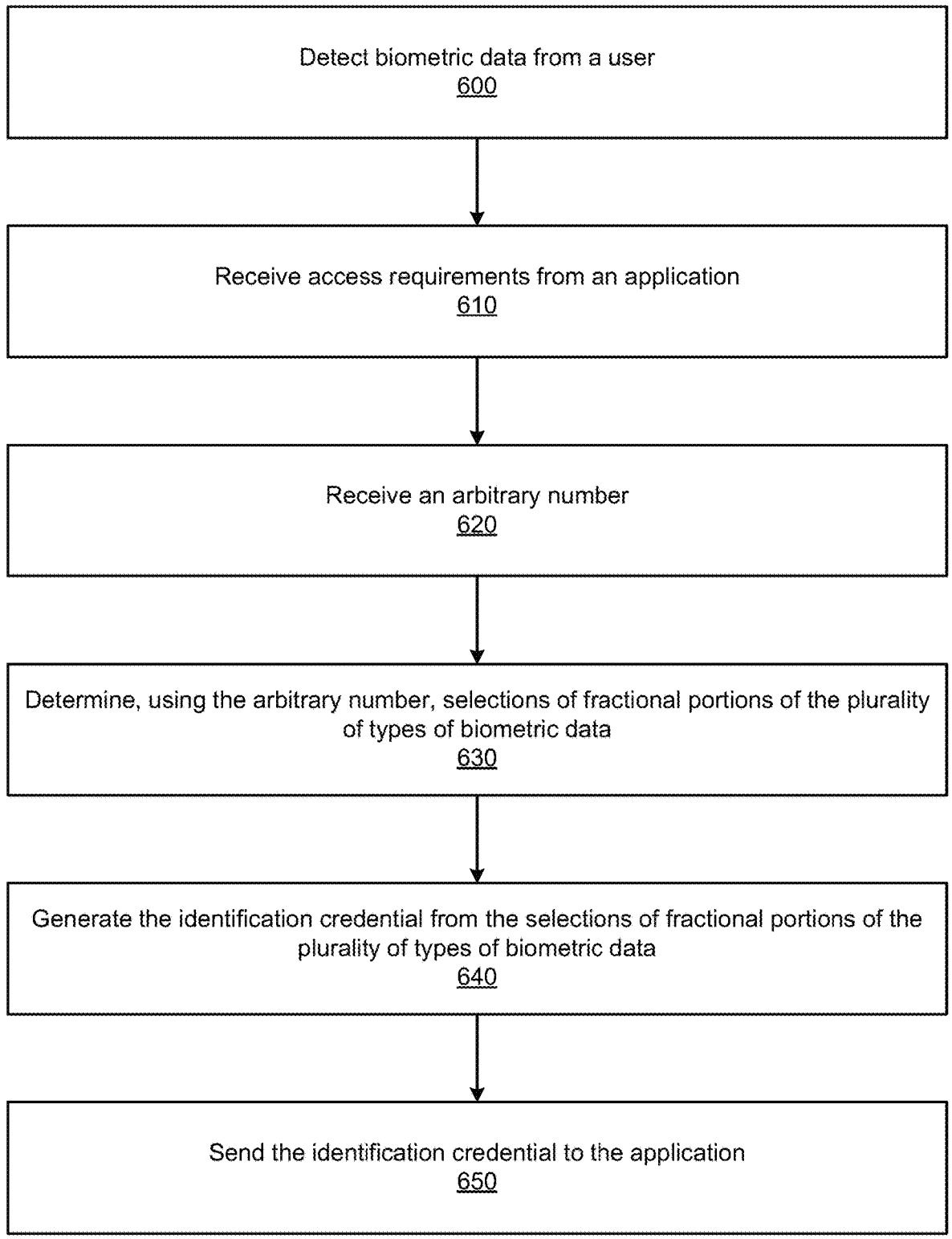
FIG. 6 illustrates an example method embodiment in accordance with some aspects of the present technology.

FIG. 6 illustrates an example method in accordance with the present technology. This method can be carried out by the system illustrated in FIGS. 4 and 5. However, nothing in FIG. 6 should be considered limiting of the system illustrated in FIGS. 4 and 5, and likewise, the system illustrated in FIGS. 4 and 5 should not be interpreted to limit the method of FIG. 6. Any limitation of the depicted system or method will be recited in the appended claims.

The method begins when IDActivKey Generator 130 detects (600) biometric data from User 100 and receives (610) access requirements from a service, such as Application Provider 170. The biometric data can include fingerprint data, retinal scans, or facial scans. The access requirements can include specific biometrics, like fingerprints or retina scans, location requirements, trust score thresholds, or other requirements.

In order to generate an IDActivKey for the application, Biometric Map Generator 500 receives (620) an arbitrary number from Trust Platform Module 180 in Trusted Execution Environment 410. This arbitrary number is then translated and used to determine (630) fractional portions of the plurality of types of biometric data.

The arbitrary number dictates what samples of the biometric data will be used. For instance, a seed 12345 from Trust Platform Module 180 can dictate that an IDActivKey will be generated by sampling from the upper half of a thumbprint, and a left portion retinal scan. Another seed 67890 can dictate than an IDActivKey will be generated by sampling from the lower half of a thumbprint and a center portion of a facial scan.

Once the arbitrary number is received (620) and the fractional portions of the plurality of types of biometric data are determined (630), IDActivKey Generator 130 generates (640) the identification credential from the selections of fractional portions of the plurality of types of biometric data. Once generated, the IDActivKey is sent (650) to the CMFA Application 150, where it can be used to authenticate User 100 to Application Provider 170.

Trust Scores

Traditional authentication methods authenticate users and devices once at the beginning of a session. The present technology continuously authenticates users with a continuous trust score, a metric which represents how confident CMFA Device 120 is that 1) the authenticated user is still engaged in the current session, and 2) that the authenticated user and device are in compliance with access policies for a service or resource.

The trust score can be based on biometric factors, device factors, or contextual factors (location, behavior, or similar factors). Services or resources can decide what factors are necessary for authentication and trust. For example, if a service requires a user gait for identification and the user is seated, the trust score will be lower because CMFA Device 120 has less confidence that the user or access device is complying with an access policy.

Expanding on the example above, suppose a user is walking at the initial authentication of the session, but proceeds to sit down during the session. Because the CMFA device is not receiving fresh data, the trust score can decay over time. This can eventually result in a trust score low enough that the session is in danger of being terminated or at least having access levels change. In such cases, CMFA Device 120 can warn a user that the trust score is low, and direct the user to update the necessary data.

Figure 7:
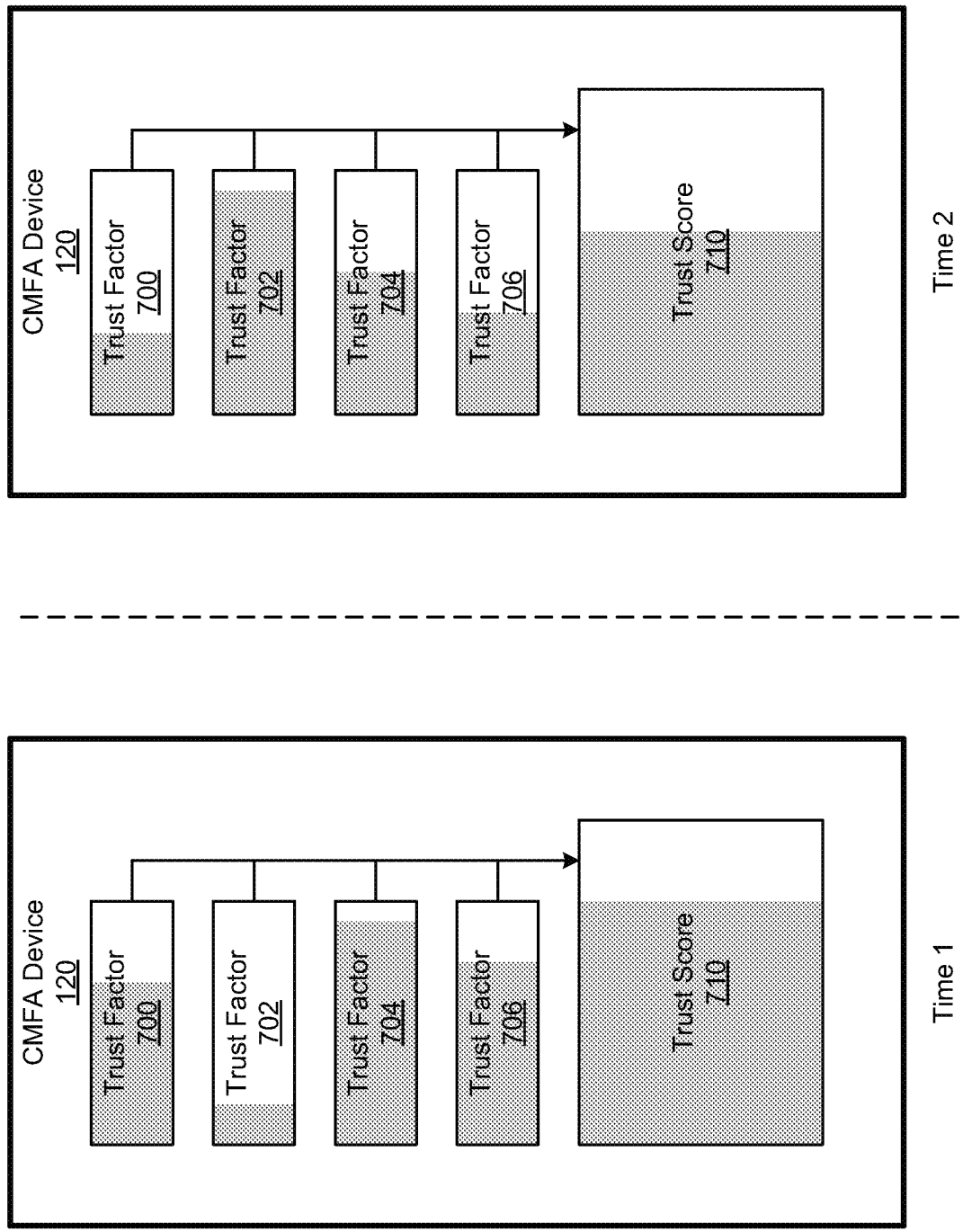
FIG. 7 illustrates an example configuration of devices and a network in accordance with some aspects of the present technology.

FIG. 7 illustrates an example system in accordance with the present technology. A trust score can be calculated at time of initial authentication, and repeatedly throughout a session with a service. The trust score can be generated from data available to CMFA Device 120 and data that is specified by a application or service provider policy. The trust score can decay with time after data which was used to determine the trust score becomes stale.

Given the number of sources of potential information that can feed into determining a (near) certain identification of a person, a trust score can represent how confident CMFA Device 120 can be that User 100 and Access Device 110 are complying with an access policy for a service or resource. Trust Score 710 is based on Trust Factors 700, 702, 704, and 706, which can be biometric factors, device factors, location factors, behavioral factors, or other factors. When data for all the factors are available and the user is accessing the service according to the application or service provider policy, CMFA Device 120 can be nearly certain that the User 100 is who they claim to be and that the access policy is being complied with, and the trust score can be high.

At Time 1, the values for Trust Factors 700, 702, 704, and 706 are determined according to the application or service provider policy for the respective Application Provider 170, and a combined value of Trust Score 710 is determined. At a later Time 2, Trust Factors 700, 704, and 706 have decreased values due to a lack of fresh data to update the trust in these factors. For example, if an access policy requires that the user identity is determined in part by a user's gait and in part by a user's voice, and the user has recently been sitting at their desk (not walking) working (not talking), there might not be data for these factors and the trust score will be lower because CMFA Device 120 has less confidence that the user or access device is complying with the access policy.

Trust Factor 702 has increased from Time 1 to Time 2, indicating that fresh data has been acquired. This can happen every time User 100 re-inputs biometric data, walks, or updates their location, or otherwise supplies a trust factor with new, relevant information.

A particular service or resource using a trusted authentication provider to authenticate a user can decide which factors should be used to identify and trust a user. The service or resource can make some factors mandatory or some factors desired and can set a trust score threshold as part of an access policy for the service or resource.

A user's or access device's context can also be used for more than determination of compliance with a policy. User 100's or Access Device 110's context can also be used to determine how fast a trust score should decay. For example, if User 100 usually logs into a work network from their work location, the context for the authentication is expected and the trust score might decay slowly. On the other hand, if the authentication takes place from a foreign country (relative to the user's work environment), the authentication to the work network might decay somewhat rapidly given the dissonance from the user's or access device's usual context in logging into the work network.

Figure 8:
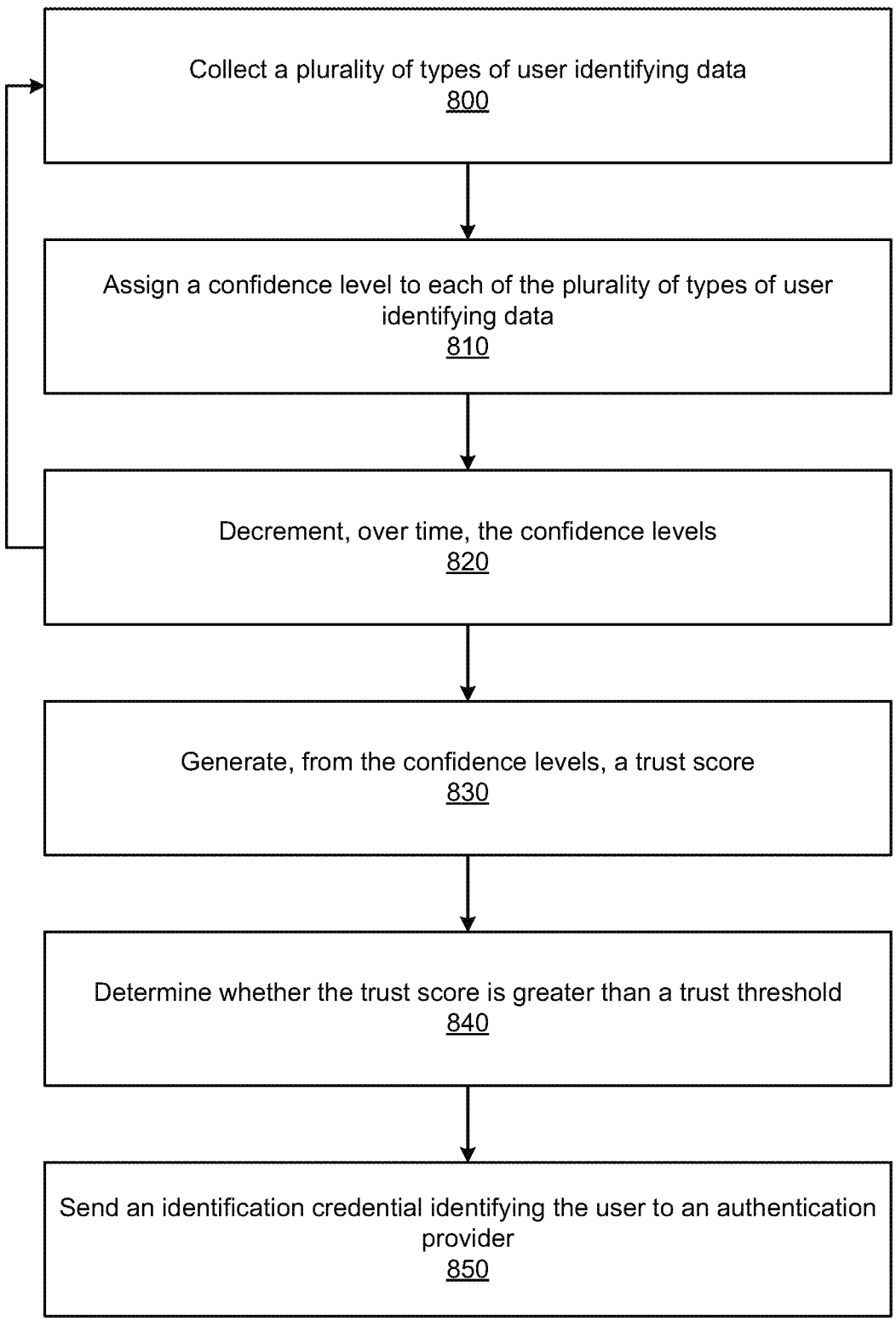
FIG. 8 illustrates an example method embodiment in accordance with some aspects of the present technology.

FIG. 8 illustrates an example method embodiment in accordance with the present technology.

The method begins when CMFA Device 120 collects (800) a plurality of types of identifying data from User 100 and contextual information from applications on CMFA Device 120. This can include biometric data like fingerprints or retinal scans, behavioral data like movement or browsing activity, or contextual data like geospatial location or proximity to another device.

Depending on the configuration of CMFA Device 120 and the application or service provider policies of particular services or resources, this data can be collected whenever available or at set intervals. Different pieces of the plurality of identifying data can be collected using different strategies.

Once collected, CMFA Device 120 assigns (810) a confidence level to each of the plurality of types of user identifying data. These trust scores are assigned independently to each Trust Factor 700, 702, 704, or 706, which may represent any of the plurality of types of identifying data. Confidence levels can be based on a number of factors, including recency of the received data, quality of the received data, variance from previously received data, or other factors.

Confidence levels are decremented (820) over time. This allows CMFA Device 120 to continually ensure that User 100 is authenticated, and if not, to terminate the session or change the access level of User 100. Decrement rates can be determined for each Trust Factor 700, 702, 704, or 706, and can be set for each Application Provider 170, 170-2, or 170-3 as well.

Trust Score 710 is generated (830) using the confidence levels of Trust Factors 700, 702, 704, or 706. Trust Score 710 can be generated by averaging the confidence levels of Trust Factors 700, 702, 704, or 706, or by a more complicated formula. The formula for calculating Trust Score 710 can be set for each Application Provider 170-1, 170-2, or 170-3. Furthermore, for a given Application Provider 170-1, Trust Factors 700, 702, 704, and 706 can be weighted in different ways depending on time of day, identity of User 100, or other factors.

Once created, the method determines (840) whether Trust Score 710 clears a trust threshold set by Application Provider 170-1, 170-2, or 170-3.

If Trust Score 710 clears the trust threshold, CMFA Device 120 sends (850) an identification credential identifying User 100 to Trusted Authentication Provider 160. This identification credential confirms to Trusted Authentication Provider 160 that the identity of User 100 has been satisfactorily confirmed, and that User 100 has cleared the threshold to access Application Provider 170-1, 170-2, or 170-3.

In addition to using Trust Score 710 to permit access (to initiate a session) with a service, Trust Score 710 can be repeatedly refreshed, and a session can be permitted to continue as long as Trust Score 710 remains above the threshold specified by the application or service provider policy.

A particular service or resource using continuous multi-factor authentication for its users can decide which factors should be used to identify and trust a user. Trust factors can be mandatory or merely desirable, and the service or resource can set a trust score threshold for each trust factor.

Trust factors can include contextual information (such as location or proximate device information, device orientation, background applications, etc.), biometric information (such as fingerprints, facial recognition, or retinal scans, etc.), or behavioral information. Services or resources can determine their tolerances for variations in trust score measures, as well as their importance for ultimately determining user authentication.

Application or Service Provider Policies

Figure 9:
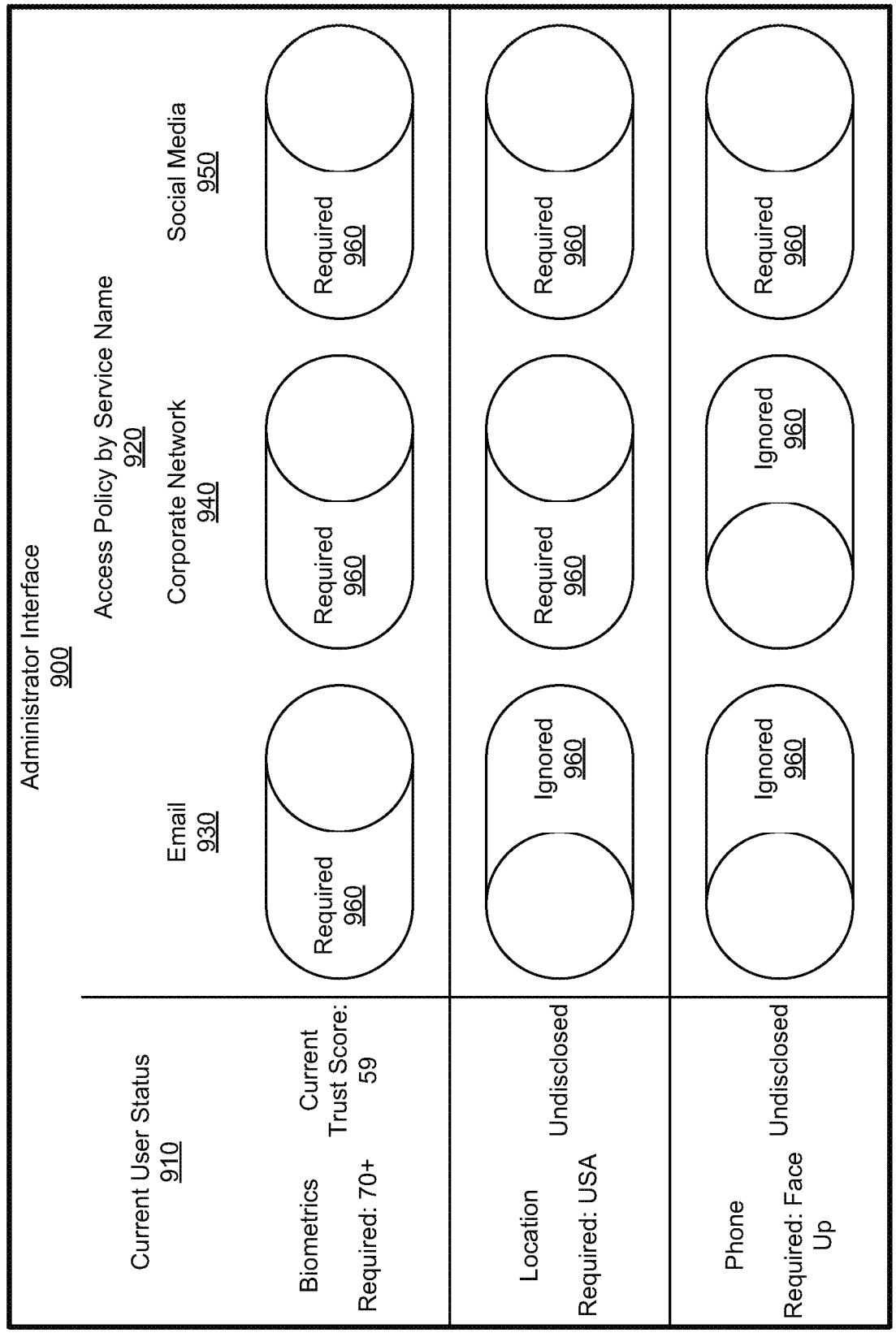
FIG. 9 illustrates an example configuration of devices and a network in accordance with some aspects of the present technology.

FIG. 9 illustrates an example system in accordance with some aspects of the present technology. FIG. 9 illustrates an example administrator interface 900 that can be used by a network administrator to specify a application or service provider policy to access a Application Provider 170. A application or service provider policy can specify factors that are required to be present or verified in order to trust an authentication of a user to start or maintain a session with Application Provider 170.

Administrator Interface 900 is a user interface used by an administrator of a application or service provider. For example, enterprise services used internally, such as a company intranet, may require biometric and location identification for access. However, a client-oriented service such as a social network may only require biometric identification. The network administrator can manage these different requirements for Application Providers 170 on Administrator Interface 900 by determining which factors are necessary to access a service.

Current User Status 910 shows the status of User 100 for a set of factors relevant for at least one of the services listed: Email 930, Corporate Network 940, or Social Media 950. Current User Status 910 can show required thresholds or criteria, as well as User 100's current relation to those thresholds or criteria.

Access Policy by Service Name 920 shows the required criteria for all of the services listed. For each service, individual factors like biometrics, location, or phone status can be required or ignored, and set by the appropriate Selector 960.

The network administrator can change the access requirements as needed in response to changes in company policy or employee needs.

FIG. 10 illustrates an example system in accordance with the present technology. Application or service provider Interface 1000 is used by a application or service provider administrator to determine access policies for a service.

Current User Status 910 shows the status of User 100 as it relates to authentication for Corporate Network 940. It can track the identity, context, and dynamic monitoring of User 100 in this embodiment, and other factors in other embodiments.

Identity Requirements 1030 are set by the service administrator in Application or service provider Interface 1000. A minimum trust score can be set to keep a session active, and each biometric can be required or ignored. These biometrics can have a maximum duration for which they are valid, at which point they need to be updated by User 100.

Context Requirements 1040 are also set by the service administrator in Application or service provider Interface 1000. Contextual information can be required or ignored, have a set validation period, and have a requirement threshold.

Figure 11:
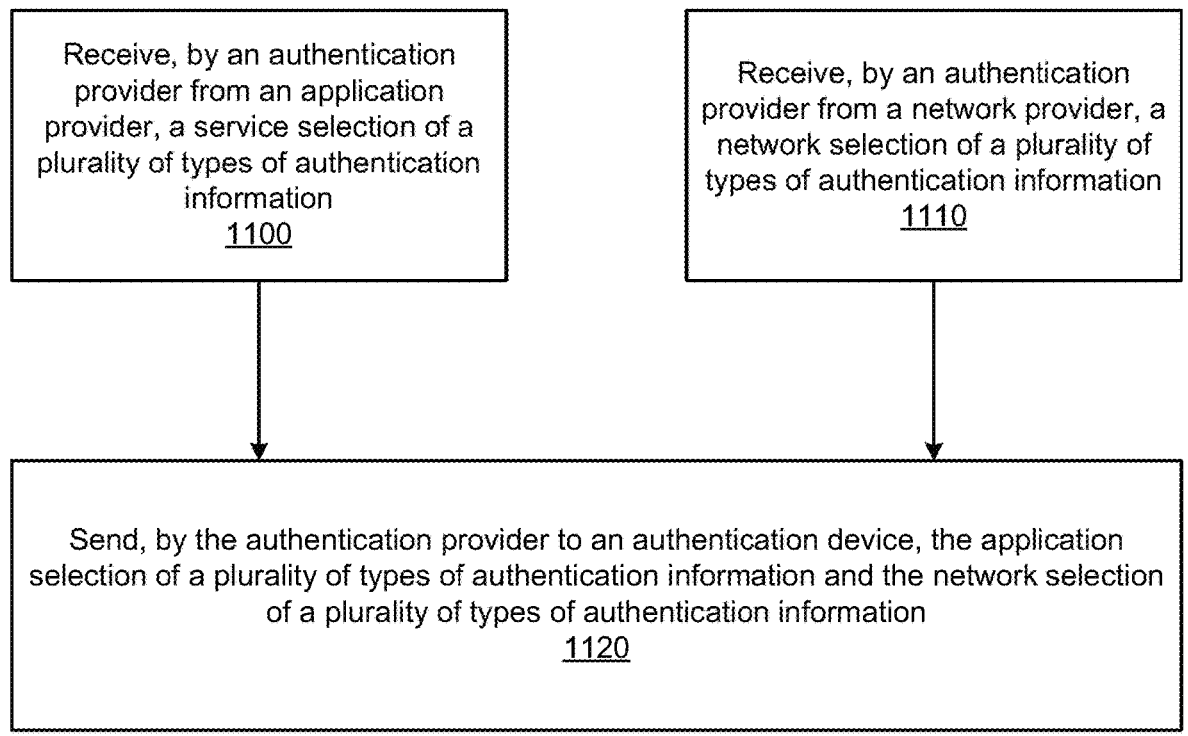
FIG. 11 illustrates an example method embodiment in accordance with some aspects of the present technology.

FIG. 11 illustrates an example method embodiment in accordance with the present technology.

The method begins when Trusted Authentication Provider 160 receives (1100) a selection of a plurality of types of authentication information from a service, and receives (1110) a selection of a plurality of types of authentication information from a network provider.

The service administrator can set authentication requirements using Application or service provider Interface 1000. The network administrator can set authentication requirements for a plurality of services using Administrator Interface 900.

Trusted Authentication Provider 160 sends (1120) these pluralities of types of authentication information to CMFA Device 120. These pluralities of types of authentication information then inform the creation of an IDActivKey, addressed in detail above.

Verified Claims while the user's IDActivKey (identification credential) functions as a biometric identifier, the IDActivKey doesn't verify certain characteristics. For example characteristics such as age, address, and other non-biometric information cannot be verified without the help of a third party. For example, a person's age can only be verified a government authority. A driver's license number is another example of a credential issued and verified by a third-party authority. In the context of the present technology, such information about a user is called a claim, since the user will assert that their age or other characteristic is true to Trusted Authentication Provider 160, which can verify the claim as addressed below.

A goal of the present technology is to keep the user identifiable information, and even the user's identity anonymous. Yet, in some cases, application or service provider policies need to confirm that the user possesses certain qualifications, some of which may be sensitive (such as having a social security number, being over a certain age, etc.).

Figure 12:
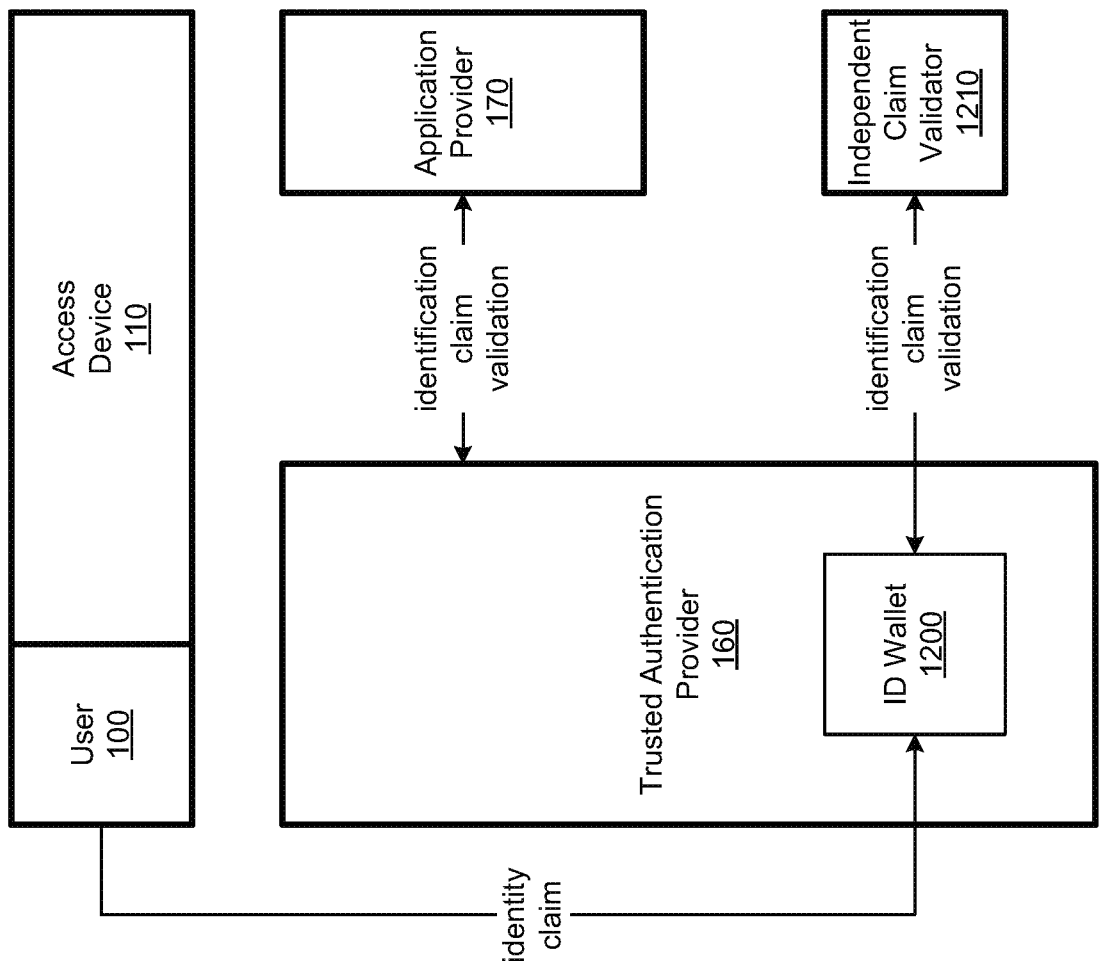
FIG. 12 illustrates an example configuration of devices and a network in accordance with some aspects of the present technology.

FIG. 12 illustrates an example system in accordance with the present technology in which an independent claim validator can verify an identity claim stored in a trusted authentication provider. This claim can then be confirmed to services by the trusted authentication provider. User 100 can create identity claims to be stored in ID Wallet 1200 in association with one of more IDActivKeys in ID Wallet 1200. An identity claim is an assertion made by User 100 that can be verified by an authority. For instance, User 100 may claim to be enrolled in a university in order to obtain student discounts online. These claims will be accompanied with the name of Independent Claim Validator 1210 (in this case the university) which can verify such claims.

ID Wallet 1200 can be storage for verified identify claims and IDActivKeys associated with a user. ID Wallet 1200 can receive a claim from User 100 and can verify the identity claim by contacting Independent Claim Validator 1210. When a claim is confirmed by Independent Claim Validator 1210, ID Wallet 1200 can record that identity claim has been verified and store this claim for later use by any service by associating the claim with the user profile. In some embodiments, ID Wallet 1200 can store a master IDActivKey for each User 100 which controls access to Trusted Authentication Provider 160.

Independent Claim Validator 1210 can be any entity having authority over the identify claim. As such, there can be any number of Independent Claim Validators 1210 as different authorities will be needed to verify different claims. Examples of Independent Claim Validators 1210 can include universities, government agencies such as a vital statistics agency, a department of motor vehicles, the Social Security service, a health care provider, etc.

When Application Provider 170 asks if User 100 is enrolled in a university as part of its validation process, Trusted Authentication Provider 160 can confirm that this is true to Application Provider 170. However, when doing so, it does not need to reveal the specific university that User 100 is enrolled in; it only confirms the content of the claim. In this way, claims can be validated and used without unnecessarily compromising the privacy of User 100.

Figure 13:
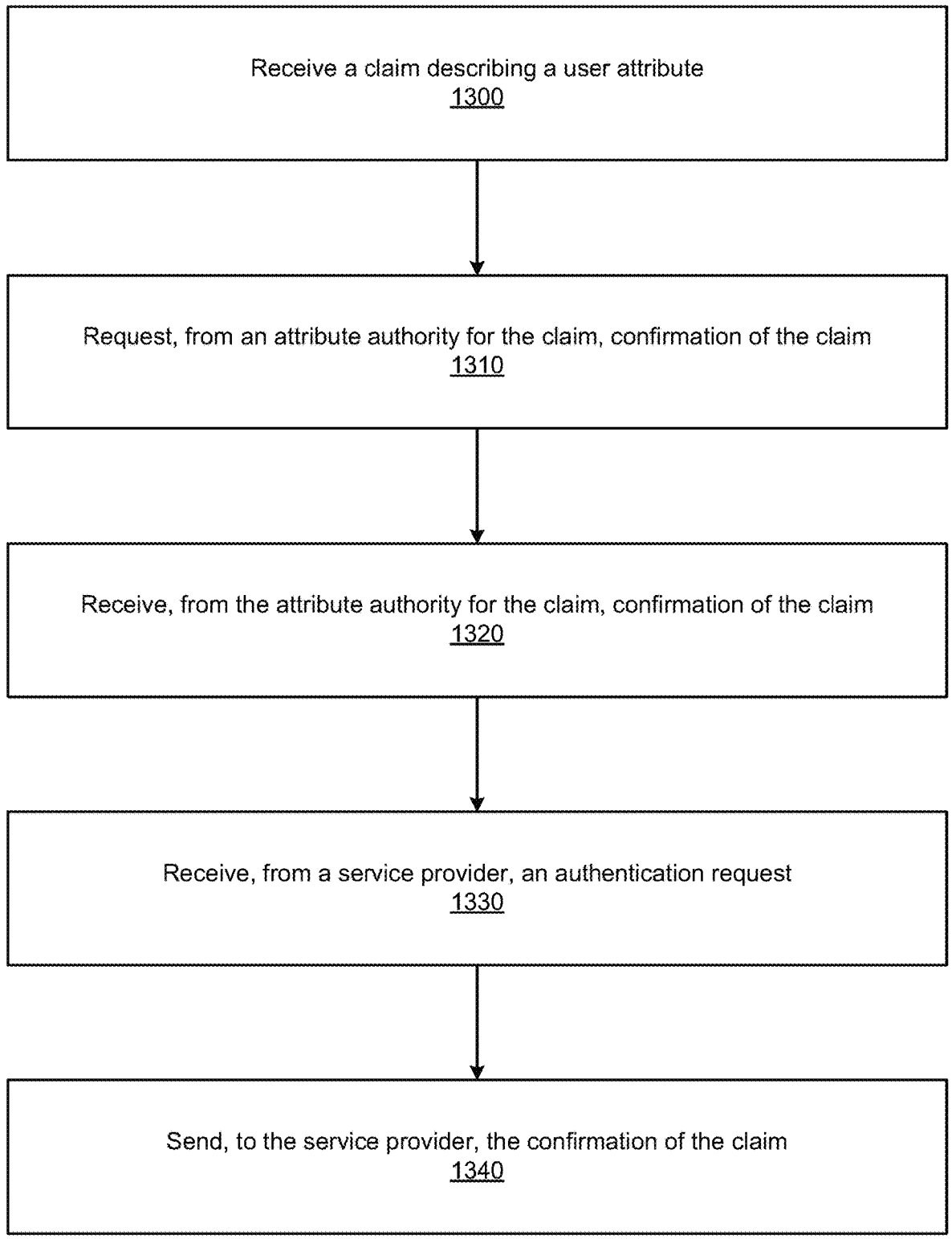
FIG. 13 illustrates an example method embodiment in accordance with some aspects of the present technology.

FIG. 13 illustrates an example method embodiment in accordance with the present technology.

The method begins when Trusted Authentication Provider 160 receives (1300) an identity claim describing an attribute of User 100. This claim could be that User 100 is over 18, that User 100 is a student, or any other claim that could affect access policies used by Application Providers 170-1, 170-2, or 170-3.

Trusted Authentication Provider 160 then requests (1310) confirmation of the claim from Independent Claim Validator 1210. Independent Claim Validator can be a state-run resource like the DMV, a private university, an employer, another service or resource, or some other organization capable of validating claims. After verification, Trusted Authentication Provider 160 receives (1320) confirmation of the claim.

The claim has now been made and validated. When Trusted Authentication Provider 160 receives (1330) an authentication request from Application Provider 170-1, 170-2, or 170-3, it can send (1340) confirmation of the claim in response. This confirmation does not have to reveal the content of the claim itself. For instance, suppose that Application Provider 170 requires that User 100 be greater than 18 years old. User 100 can make a claim that s/he was born on Jan. 1, 2000, which can then be verified by a local hospital. However, when Application Provider 170 requests confirmation that User 100 is greater than 18 years old, Trusted Authentication Provider 160 can confirm that fact without revealing the birthdate of User 100.

Bound Devices and User Identity

Users today have multiple devices, and may desire to access a service or resource from a device other than the CMFA device while using the credentials supplied by the CMFA device. In such cases, it is necessary to bind a user, its access device, and the CMFA device in order to ensure authentication.

Figure 14:
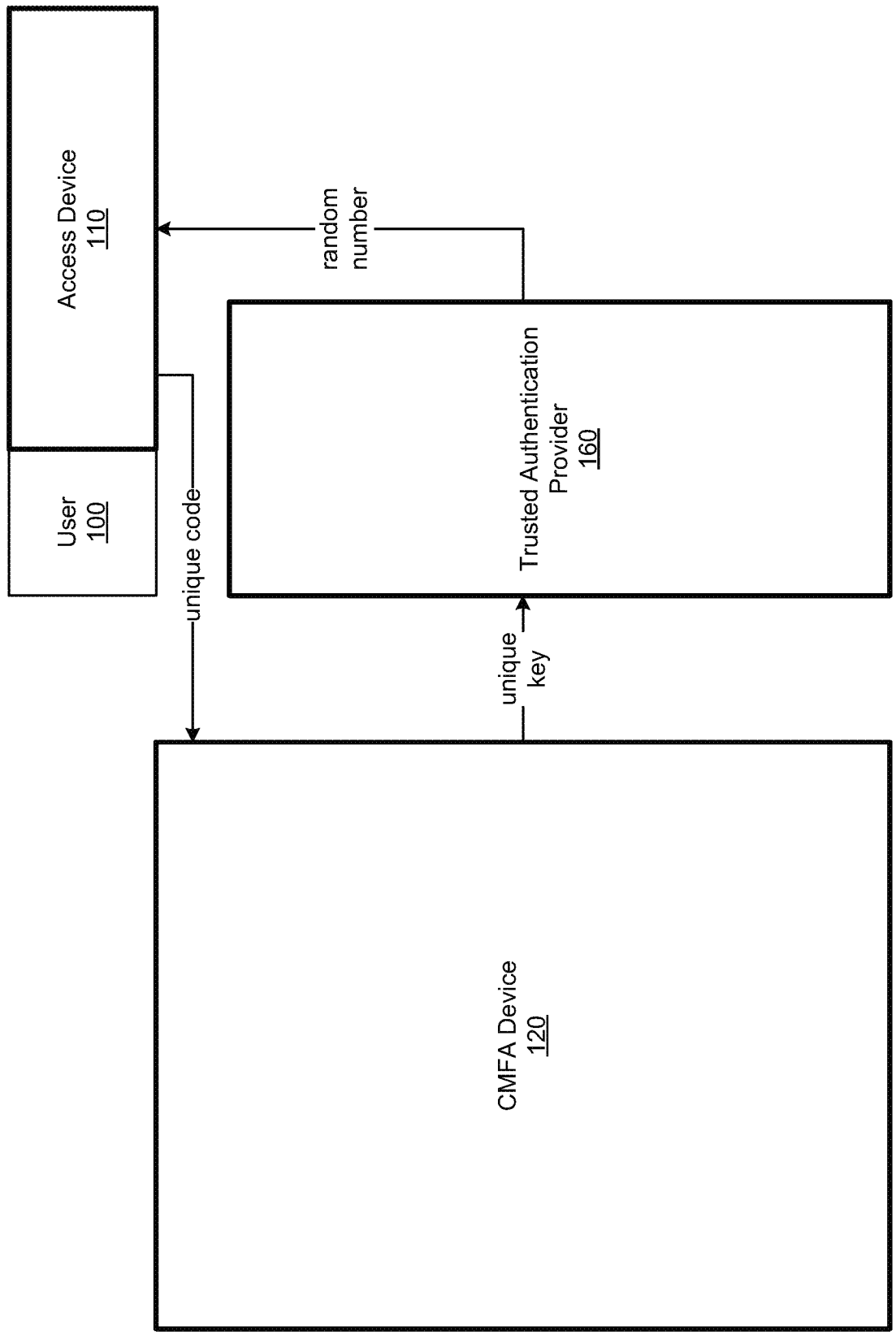
FIG. 14 illustrates an example configuration of devices and a network in accordance with some aspects of the present technology.

FIG. 14 illustrates an example system to bind Access Device 110 to CMFA Device 120 in accordance with the present technology. The system illustrated in FIG. 14 can allow User 100 to bind their digital identity with the devices used to authenticate and connect to a service or resource. Such binding can increase a trust score provided by a CMFA Device 120 when the user is accessing a service using Access Device 110. The system can ensure with high trust the physical proximity of User 100 to Access Device 110. CMFA Device 120 can act as a trusted proxy in verifying this physical presence. The system can also be configured to require an IDActivKey to log into Access Device 110, thus treating it as a service.

This binding could be subject to a time period. Prior to expiration, the binding must be refreshed. Upon expiration, the binding would be deleted. This helps to curtail misuse in case of a device loss.

Figure 15:
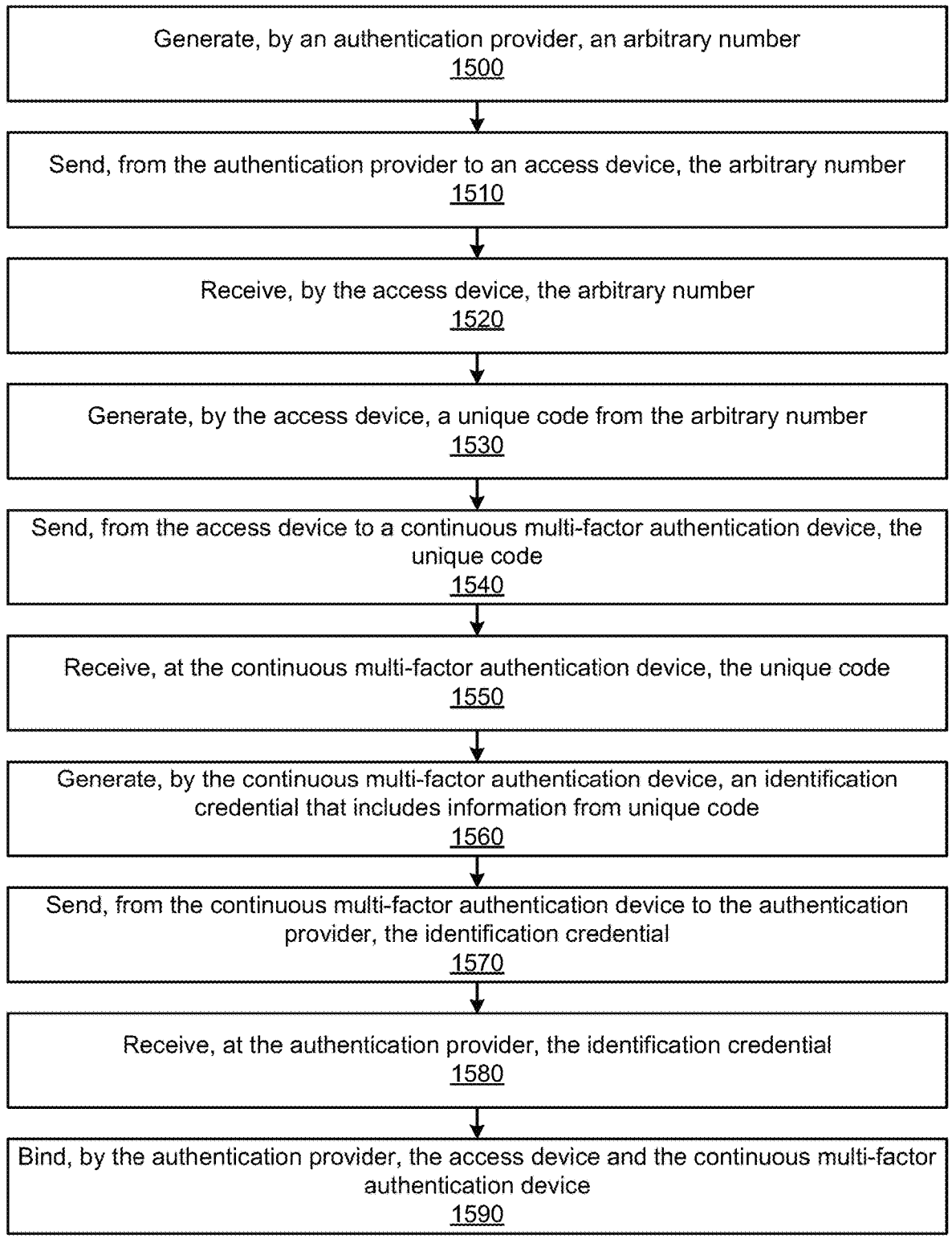
FIG. 15 illustrates an example method embodiment in accordance with some aspects of the present technology.

FIG. 15 illustrates an example method embodiment in accordance with the present technology.

The method begins when Trusted Authentication Provider 160 generates (1500) and sends (1510) an arbitrary number to Access Device 110. Access Device 110 receives (1520) the arbitrary number and proceeds to generate (1530) a unique code, using the arbitrary number as a seed. The unique code can be generated by a transformation function based on a secret key, such as a hash-based message authentication code.

After Access Device 110 sends (1540) the unique code and CMFA Device 120 receives (1550) the unique code, CMFA Device 120 generates (1560) an identification credential for User 100. The identification credential includes information contained in the unique code received from Access Device 110 in addition to biometrics. The unique code can be transformed by a function based on a secret key before it is included in the identification credential.

After CMFA Device 120 sends (1570) the identification credential and Trusted Authentication Provider 160 receives (1580) the identification credential, Trusted Authentication Provider 160 binds (1590) Access Device 110 and CMFA Device 120. This binding can signify using the identification credential to log in to Access Device 110 using CMFA Device 120, or verify the physical proximity of Access Device 110 to CMFA Device 120.

Figure 16:
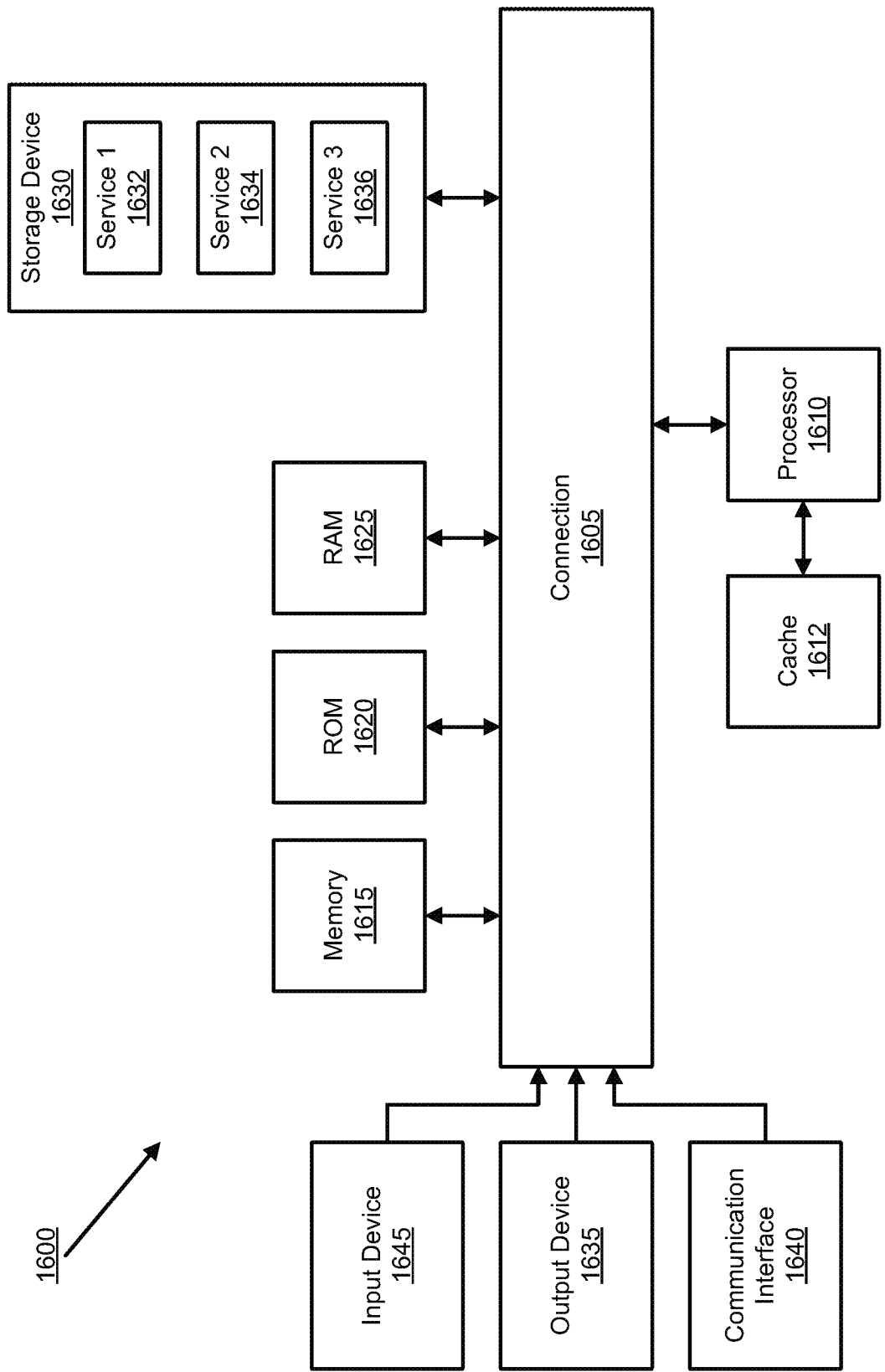
FIG. 16 illustrates an example computing system in accordance with some aspects of the present technology.

FIG. 16 illustrates an example computing system architecture System 1600 including components in electrical communication with each other using a Connection 1605, such as a bus, upon which one or more aspects of the present disclosure can be implemented. System 1600 includes a processing unit (CPU or processor) Processor 1610 and a system Connection 1605 that couples various system components including the system Memory 1615, such as read only memory ROM 1620 and random access memory RAM 1625, to the Processor 1610. The System 1600 can include a cache of high-speed memory connected directly with, in close proximity to, or integrated as part of the Processor 1610. The System 1600 can copy data from the Memory 1615 and/or the Storage Device 1630 to the Cache 1612 for quick access by the Processor 1610. In this way, the cache can provide a performance boost that avoids Processor 1610 delays while waiting for data. These and other modules can control or be configured to control the Processor 1610 to perform various actions. Other system Memory 1615 may be available for use as well. The Memory 1615 can include multiple different types of memory with different performance characteristics. The Processor 1610 can include any general purpose processor and a hardware or software service, such as Service 1 1632, Service 2 1634, and Service 3 1636 stored in Storage Device 1630, configured to control the Processor 1610 as well as a special-purpose processor where software instructions are incorporated into the actual processor design. The Processor 1610 may be a completely self-contained computing system, containing multiple cores or processors, a bus, memory controller, cache, etc. A multi-core processor may be symmetric or asymmetric.

To enable user interaction with the computing device System 1600, an Input Device 1645 can represent any number of input mechanisms, such as a microphone for speech, a touch-sensitive screen for gesture or graphical input, keyboard, mouse, motion input, speech and so forth. An Output Device 1635 can also be one or more of a number of output mechanisms known to those of skill in the art. In some instances, multimodal systems can enable a user to provide multiple types of input to communicate with the computing device System 1600. The Communications Interface 1640 can generally govern and manage the user input and system output. There is no restriction on operating on any particular hardware arrangement and therefore the basic features here may easily be substituted for improved hardware or firmware arrangements as they are developed.

Storage Device 1630 is a non-volatile memory and can be a hard disk or other types of computer readable media which can store data that are accessible by a computer, such as magnetic cassettes, flash memory cards, solid state memory devices, digital versatile disks, cartridges, random access memories RAMs 1625, read only memory ROM 1620, and hybrids thereof.

The Storage Device 1630 can include Services 1632, 1634, 1636 for controlling the Processor 1610. Other hardware or software modules are contemplated. The Storage Device 1630 can be connected to the system Connection 1605. In one aspect, a hardware module that performs a particular function can include the software component stored in a computer-readable medium in connection with the necessary hardware components, such as the Processor 1610, Connection 1605, Output Device 1635, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of deriving an identification credential comprising:
   detecting a plurality of types of biometric data of a user;
   receiving a randomly generated number;
   translating the randomly generated number into selections of fractional portions of the plurality of types of biometric data;
   generating the identification credential from the fractional portions of the plurality of types of biometric data; and
   during a first log-in with a service provider, storing information identifying the service provider and the randomly generated number used to create the identification credential in a storage of a trusted execution environment on a continuous multifactor authentication device, wherein during the first log-in the randomly generated number is generated by a hardware root of trust located in the trusted execution environment;
   wherein the randomly generated number is received from the storage in the trusted execution environment during a log-in to the service provider that is subsequent to the first log-in.

2. The method of claim 1, wherein the randomly generated number is generated by a hardware root of trust located in a trusted execution environment on a continuous multifactor authentication device.

3. The method of claim 1, comprising:
   receiving context data from an operating system or application executing on the continuous multifactor authentication device,
   determining that the context of a continuous multifactor authentication device meets access conditions necessary to generate the identification credential.

4. The method of claim 3, wherein the access conditions that specify the context, and the types of biometric data in the plurality of types of biometric data are specified by an access provider.

5. The method of claim 1, comprising:
   determining from the plurality of types of biometric data or from data derived by an operating system or applications on a continuous multifactor authentication device, that the user is under stress;
   disallowing the generating of the identification credential.

6. A continuous multifactor authentication system comprising:
   a trusted execution environment having a processor and memory storing instructions, the instructions programmed to cooperate with the processor to cause the trusted execution environment to:
   detect a plurality of types of biometric data of a user;
   receive a randomly generated number;
   translate the randomly generated number into selections of fractional portions of the plurality of types of biometric data;
   generate an identification credential from the fractional portions of the plurality of types of biometric data; and
   during a first log-in with a service provider, storing in a storage information of the trusted execution environment information identifying the service provider and the randomly generated number used to create the identification credential, wherein during the first log-in the randomly generated number is generated by a hardware root of trust located in the trusted execution environment;
   receive the randomly generated number from the storage in the trusted execution environment during a log-in to the service provider that is subsequent to the first log-in.

7. The continuous multifactor authentication system of claim 6 comprising:
   a rich execution environment configured to collect contextual information from applications and an operating system executing on the continuous multifactor authentication system.

8. The continuous multifactor authentication system of claim 6, wherein the randomly generated number is generated by a hardware root of trust located in a trusted execution environment on a continuous multifactor authentication device.

9. The continuous multifactor authentication system of claim 6, the trusted execution environment further configured to:
   receive context data from an operating system or application executing on the continuous multifactor authentication system,
   determine that the context of a continuous multifactor authentication device meets access conditions necessary to generate the identification credential.

10. The continuous multifactor authentication system of claim 9, wherein the access conditions that specify the context, and the types of biometric data in the plurality of types of biometric data are specified by an access provider.

11. A non-transitory computer readable medium comprising instructions stored thereon, the instructions are effective to cause at least one processor of a continuous multifactor authentication system to perform operations comprising:
   detect a plurality of types of biometric data of a user;
   receive a randomly generated number;

translate the randomly generated number into selections of fractional portions of the plurality of types of biometric data; and generate an identification credential from the fractional portions of the plurality of types of biometric data; and during a first log-in with a service provider, store information in a storage of a trusted executed environment identifying the service provider and the randomly generated number used to create the identification credential, wherein during the first log-in the randomly generated number is generated by a hardware root of trust located in the trusted execution environment;

wherein the trusted execution environment is configured to receive the randomly generated number from the storage in the trusted execution environment during a log-in to the service provider that is subsequent to the first log-in.

12. The non-transitory computer readable medium of claim 11, wherein the instructions are effective to cause at least one processor to generate the randomly generated number by a hardware root of trust located in a trusted execution environment on a continuous multifactor authentication device.

13. The non-transitory computer readable medium of claim 11, wherein the instructions are effective to cause at least one processor to:
  receive context data from an operating system or application executing on the continuous multifactor authentication system,
  determine that the context of a continuous multifactor authentication device meets access conditions necessary to generate the identification credential.

14. The non-transitory computer readable medium of claim 11, wherein the instructions are effective to cause at least one processor to:
  determine from the plurality of types of biometric data or from data derived by an operating system or applications on a continuous multifactor authentication device, that the user is under stress;
  disallow the generating of the identification credential.

* * * * *